(12) United States Patent
Kitada et al.

(10) Patent No.: US 11,293,535 B2
(45) Date of Patent: Apr. 5, 2022

(54) HYDRODYNAMIC LAUNCH DEVICE HAVING AN ACTIVE DYNAMIC DAMPER

(71) Applicant: EXEDY GLOBALPARTS CORPORATION, Belleville, MI (US)

(72) Inventors: Kenji Kitada, Osaka (JP); Scott Binder, South Lyon, MI (US); Ken Mototsune, Canton, MI (US); Daniel Leschuk, Chelsea, MI (US)

(73) Assignee: EXEDY GLOBALPARTS CORPORATION, Belleville, MI (US)

( * ) Notice: Subject to any disclaimer, the term of this patent is extended or adjusted under 35 U.S.C. 154(b) by 0 days.

(21) Appl. No.: 16/964,866

(22) PCT Filed: Jan. 25, 2019

(86) PCT No.: PCT/US2019/015132
§ 371 (c)(1),
(2) Date: Jul. 24, 2020

(87) PCT Pub. No.: WO2019/147926
PCT Pub. Date: Aug. 1, 2019

(65) Prior Publication Data
US 2021/0062902 A1    Mar. 4, 2021

Related U.S. Application Data

(60) Provisional application No. 62/622,431, filed on Jan. 26, 2018.

(51) Int. Cl.
*F16H 45/02* (2006.01)
*F16H 61/14* (2006.01)

(52) U.S. Cl.
CPC ............ *F16H 45/02* (2013.01); *F16H 61/14* (2013.01); *F16H 2045/0205* (2013.01);
(Continued)

(58) Field of Classification Search
CPC .. F16H 45/02; F16H 61/14; F16H 2045/0278; F16H 2045/0205; F16H 2045/0231; F16H 2045/0247
See application file for complete search history.

(56) References Cited

U.S. PATENT DOCUMENTS

2011/0192691 A1* 8/2011 Murata ................... F16H 45/02
192/3.3
2015/0362053 A1   12/2015 Kawahara
(Continued)

FOREIGN PATENT DOCUMENTS

JP        2010091099 A    4/2010

*Primary Examiner* — Mark A Manley
(74) *Attorney, Agent, or Firm* — Eric J. Sosenko; Jonathan P. O'Brien; Honigman LLP

(57) ABSTRACT

A launch device coupling a prime mover to a transmission. The launch device includes a front cover for connecting to the output of the prime mover and an output hub for connecting to the input of the transmission. A rear cover is connected to the front cover and cooperates to define a chamber. Within the chamber are an impeller and a turbine having a plurality of opposing blades such that hydraulic fluid is directed from the impeller blades and toward the turbine blades. A main damper is provided between the turbine and output hub of the launch device. Coupled to the main damper is a lock-out clutch configured to releasably lock the main damper for rotation with one of the front and rear covers. The launch device also includes an active dynamic damper system coupled to the main damper and configured to reduce resonance influence on the main damper.

7 Claims, 3 Drawing Sheets

(52) U.S. Cl.
CPC ........... *F16H 2045/0231* (2013.01); *F16H 2045/0247* (2013.01); *F16H 2045/0278* (2013.01)

(56) References Cited

U.S. PATENT DOCUMENTS

2016/0160976 A1* 6/2016 Lee .................... F16H 45/02
 192/3.29
2017/0254398 A1 9/2017 Watanabe

* cited by examiner

HYDRODYNAMIC LAUNCH DEVICE HAVING AN ACTIVE DYNAMIC DAMPER

CROSS REFERENCE TO RELATED APPLICATIONS

This application is a national stage entry of international application no. PCT/US2019/015132, filed Jan. 25, 2019, which claims the benefit U.S. provisional application No. 62/622,431 filed Jan. 26, 2018. This entire contents of the above-referenced applications are expressly incorporated herein by reference.

BACKGROUND

1. Field of the Invention

The present invention generally relates to launch devices, such as torque converters, used in connection with an automatic transmission of an automotive vehicle. More specifically, the invention relates to a tuned spring mass damper, also known as a dynamic damper, of such a launch device.

2. Description of Related Technology

Generally, vehicles with automatic transmissions utilize a torque converter to couple the output of the engine with the automatic transmission. A representative torque converter is seen in FIG. 1. The torque converter includes a front cover that is connected to the flex plate of the engine and that rotates with the flex plate. The front cover is connected to a back cover of the torque converter, the latter of which is unitary or integral with and causes rotation of an impeller.

The impeller is provided with a series of blades or vanes. During rotation of the impeller, hydraulic fluid is centrifugally forced radially outward, then forward (to the left in FIG. 1) to impact against blades of a turbine. Accordingly, the radially outward portions of the blades of the turbine are opposed to the radially outward portions of the blades of the impeller so as to receive the hydraulic fluid from the impeller.

The shape of the turbine's blades causes rotation of the turbine and redirects the hydraulic fluid radially inward (downward in the figure) and then back to the impeller. The turbine is further mounted to a hub, which is in turn mounted to an input shaft of the automatic transmission. Thus, rotation of the turbine and hub causes rotation of the input shaft and the automatic transmission.

To enable torque multiplication, located between the impeller and the turbine, and more particularly between the lower portions of the respective blades of the impeller and turbine, is a stator. The stator is mounted on a one-way clutch and redirects fluid from the turbine so that it is efficiently re-received by the impeller without impeding rotation of the impeller and resulting in the torque multiplication.

As seen from the above description, the impeller, turbine and stator define a hydrodynamic coupling or circuit is located on the rearward or transmission side of the torque converter.

Forward of the turbine, between the turbine and the front cover, the torque converter also includes a clutch assembly and a dynamic damper, the latter of which is sometimes referred to as a dynamic absorber. The clutch assembly is arranged on the forward or the engine side of the torque converter, and when engaged, the clutch assembly locks the rotation the impeller with the rotation of the front cover and the output of the engine.

Both during lockup of the clutch assembly and while disengaged, oscillations of the engine can be transferred through the torque converter. This vibration and resulting noise (NV) that can be felt and heard by the operator of the automobile. The rotational damper/dynamic absorber is provided in the launch device to limit the NV experienced by the operator of the vehicle.

Conventional dynamic absorbers have the possibility of worsening the NV performance of the vehicle in specific frequency ranges because of the resonance specific to the dynamic absorber.

SUMMARY

In overcoming various drawbacks and other limitations of the known art, the present invention provides a launch device for coupling a rotary output of a prime mover to a rotary input of a transmission that reduces resonance influence on the main damper.

In one aspect of the invention, a launch device is provided with a front cover configured to connect to the rotary output member of the prime mover and an output hub configured to connect to the rotary input of the transmission, a rear cover connected to the front cover and rotatable therewith, the front cover and the rear cover cooperating to define a chamber, an impeller having a plurality of impeller blades extending in the chamber, a turbine located within the chamber and including a plurality of turbine blades generally opposing the impeller blades such that hydraulic fluid is directed from the impeller blades and toward the turbine blades, a main damper coupled between the turbine and the output hub of the launch device, a lock-out clutch coupled to the main damper and configured to releasably lock the main damper for rotation with one of the front and rear covers, the launch device being characterized by an active dynamic damper (ADD) system coupled to the main damper and configured to reduce resonance influence on the main damper.

In another aspect of the invention, a launch device is provided for coupling a rotary output of a prime mover to a rotary input of a transmission, the launch device includes a front cover configured to connect to the rotary output member of the prime mover; an output hub configured to connect to the rotary input of the transmission; a rear cover connected to the front cover and rotatable therewith, the front cover and the rear cover cooperating to define a chamber; an impeller having a plurality of impeller blades extending in the chamber; a turbine located within the chamber and including a plurality of turbine blades generally opposing the impeller blades such that hydraulic fluid is directed from the impeller blades and toward the turbine blades; a main damper coupled between the turbine and the output hub of the launch device; a lock-out clutch coupled to the main damper and configured to releasably lock the main damper for rotation with one of the front and rear covers; and an active dynamic damper (ADD) system coupled to the main damper and configured to reduce resonance influence on the main damper.

In an additional aspect, the ADD system includes an ADD clutch and coupled to an ADD piston, the ADD piston being axially moveable and configured to move the ADD clutch between open and closed positions.

In a further aspect, a first portion of the ADD clutch is supported by the main damper.

In yet another aspect, the first portion of the ADD clutch is mounted to a side plate of the main damper.

In still a further aspect, a second portion of the ADD clutch is supported by the turbine.

In an additional aspect, the second portion of the ADD clutch includes a reaction plate extending from the turbine, the reaction plate having a reaction surface opposing a corresponding reaction surface of the first portion of the ADD clutch.

In another aspect, the turbine is coupled to the ADD piston and moveable therewith.

In a further aspect, the turbine is mounted to the ADD piston.

In yet another aspect, the ADD piston is mounted to and axially moveable along the output hub.

In still a further aspect, an axially stationary reaction plate cooperates with the ADD piston to define an ADD pressure chamber between the axially stationary reaction plate and the ADD piston.

In an additional aspect, the stationary reaction plate is mounted to the output hub.

In yet another aspect, the ADD piston is mounted to a first portion of the output hub and the stationary reaction plate is mounted to a second portion of the output hub that is different from the first portion of the output hub.

In a further aspect, a fluid passageway is coupled to the ADD pressure chamber.

In an additional aspect, the fluid passageway is at least partially defined by the output hub.

Further objects, features and advantages of this invention will become readily apparent to persons skilled in the art after review of the following description with reference to the drawings and the claims that are appended to and form a part of this specification.

DETAILED DESCRIPTION

Figure 1:
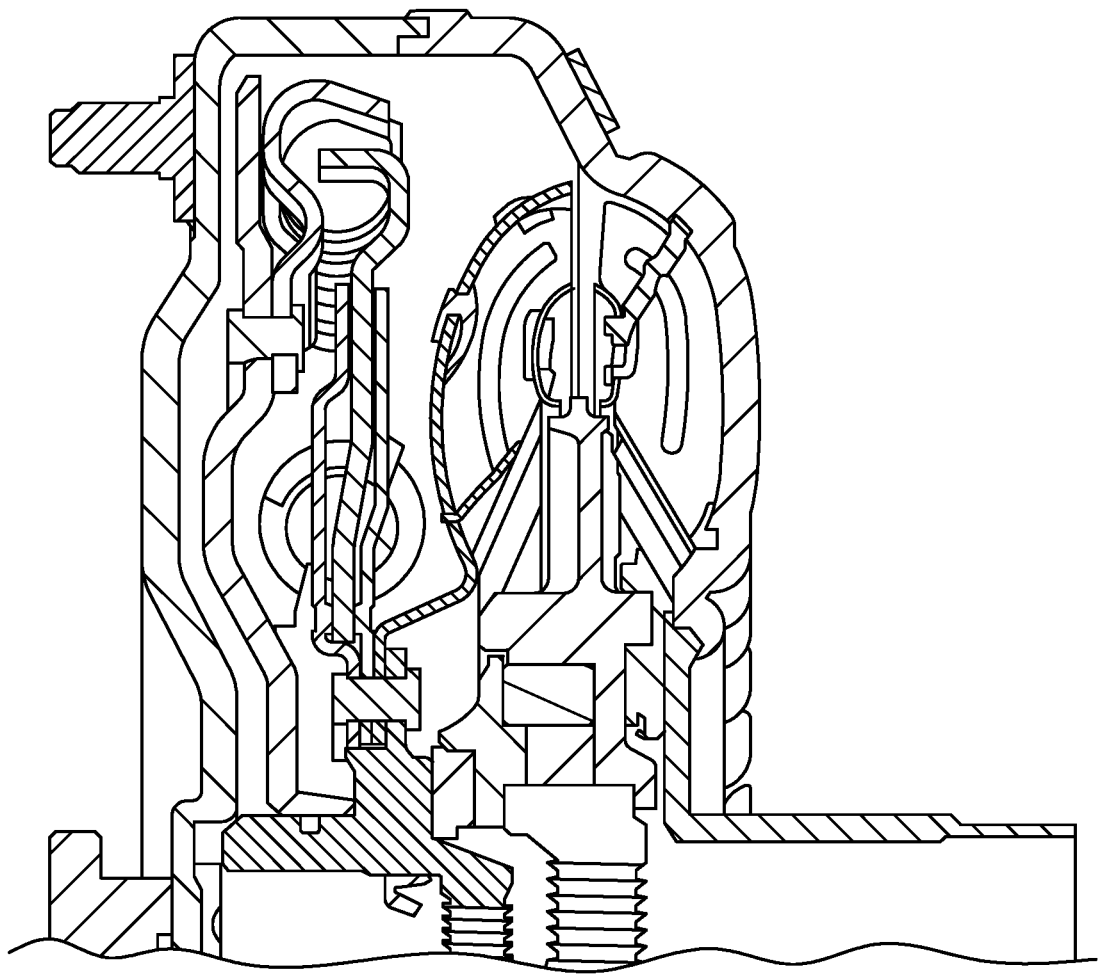
FIG. 1 is a fragmentary view, in axial cross-section, of a torque converter in accordance with a known construction of such devices, and which is discussed above.
Figure 2:
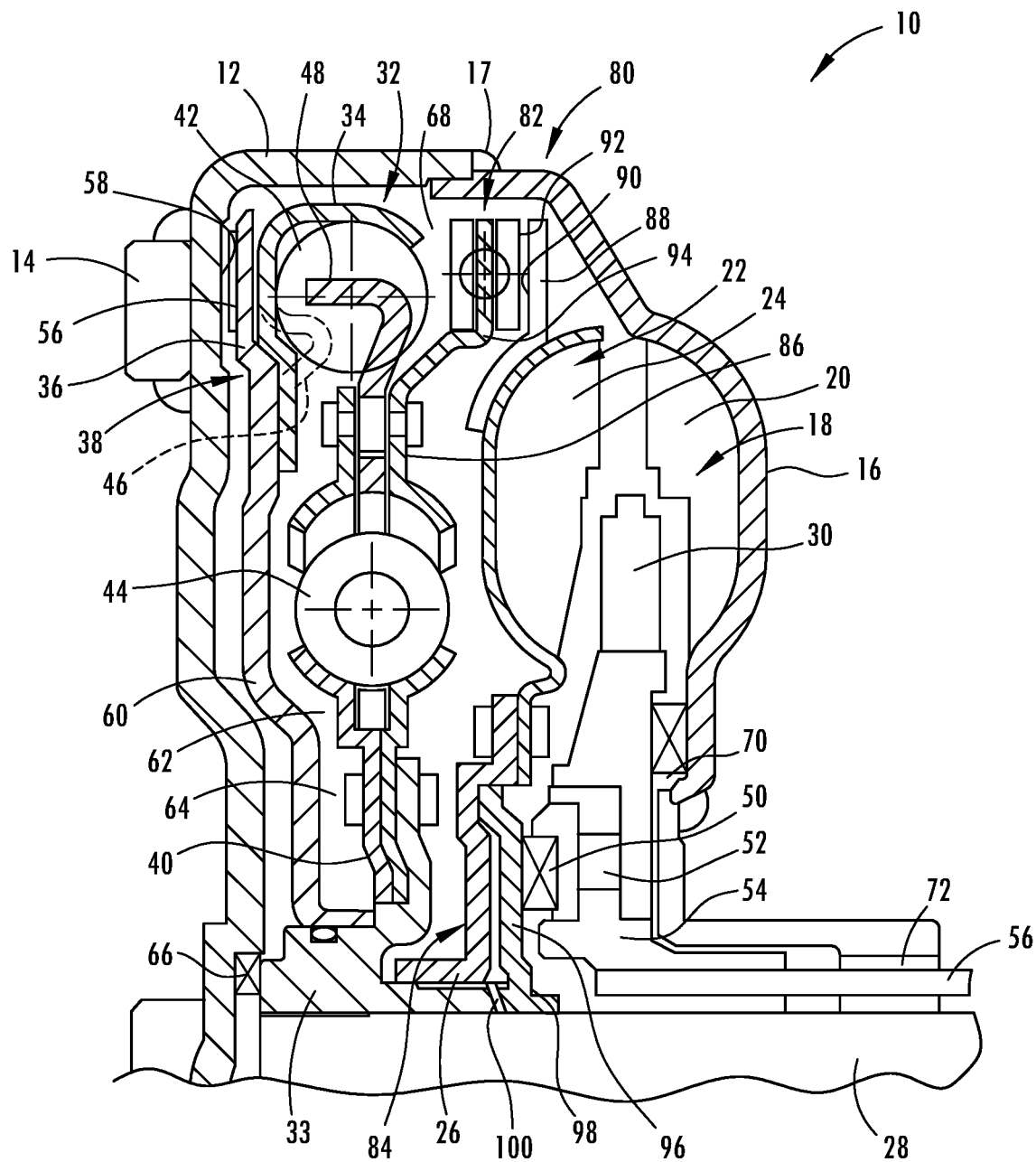
FIG. 2 is fragmentary half view, in axial cross-section, of a launch device embodying the principles of the present invention.

Referring now to the drawings, a launch device embodying the principles of the present invention is generally illustrated in FIG. 2 and will be described with reference thereto. The description that follows may use directional terms such as "upper" and "lower." These terms are intended to be read in the context of the orientation of the elements as presented in the drawings. Accordingly, "upper" indicates a direction toward the top of the drawing and "lower" indicates a direction toward the bottom of the drawing. The terms "left" and "right" are similarly interpreted. The terms "inward" or "inner" and "outward" or "outer" indicate a direction that is generally toward or away from a central axis of the referred to part, whether or not such an axis is designated in the drawing. An axial surface is therefore one that faces in the axial direction. In other words, an axial surface faces in a direction along the central axis. A radial surface therefore faces radially, generally away from or toward the central axis. It will be understood, however, that these relative terms are for convenience of description that are not intended to require a particular orientation. In actual implementation, the directional references used herein may not necessarily correspond with the installation and orientation of the corresponding components of the device.

Terms concerning attachments, coupling and the like, such as "connected," "joined," "mounted" or "interconnected" refer to a relationship where the structures are secured or attached to one another either directly or indirectly through an intervening structure. These attachments and relationships may be movable or rigid, unless expressly described otherwise. "Integral" means that elements are connected together so as to form one unit. "Unitary" means a single, one piece element where all parts of the element are formed together. Thus, the term "unitary" is to be distinguished from the term "integral."

Referring now to FIG. 2, a launch device embodying the principles of the present invention is generally illustrated therein and designated at 10. The launch device 10 includes a front cover 12 having mounting features 14, such as threaded studs, spaced about its periphery and configured to connect the launch device 10 to a flex plate or outlet of a prime mover (not shown), such as motor, including without limitation internal combustion engines, electric motors, other motive power source or combinations thereof. Also at its radial periphery, the front cover 12 is secured to a rear cover 16 by welding 17 or other suitable means to form a fluid tight chamber. The front cover 12 defines the engine side of the launch device 10, while the rear cover 16 defines the transmission side of the launch device 10. As the flex plate is rotated by the crankshaft (not shown) of the prime mover, the front and rear covers 12, 16 are rotated in therewith.

Internally, the rear cover 16 is provided with a series of blades or vanes 20 so as to form an impeller 18. During rotation of the rear cover 16, hydraulic fluid is supplied from the automatic transmission along a first pathway and is forced radially outwardly under the centrifugal force of the rotating blades 20 of the impeller 18. The blades 20 and the inner surface of the rear cover 16 also directs the hydraulic fluid forward, in a direction away from the rear cover 16. In FIG. 2, outward motion of the fluid is toward the top of the figure and forward motion of fluid is toward the left of the figure.

Immediately forward of the impeller 18, the launch device 10 includes a turbine 22 also formed with a series of blades 24. The turbine 22 is mounted to a turbine hub 26, and the turbine hub 26 is ultimately connected to a rotatable input shaft 28 of the transmission of the automotive vehicle. As seen in FIG. 2, the inner diameter of the turbine hub 26 is configured to form a splined connection.

The blades 24 of the turbine 22 are oriented to receive the hydraulic fluid from the impeller 18. The force of the hydraulic fluid from the impeller 18 and the shape of the turbine's blades 24 drive the turbine 22 in a rotational direction that is the same as the rotational direction of the impeller 18. Hydraulic fluid received by the turbine 22 is in turn directed downward and redirected rearward, back toward the impeller 18.

Positioned between the radially inner portions of the blades 24 of the turbine 22 and the blades 20 of the impeller 18 is a stator 30. The stator 30 receives the hydraulic fluid being returned from the turbine 22 to the impeller 18. The stator 30 redirects the fluid so that it is in the same rotational direction as the impeller 18. This redirection is conducted in such a manner that it is efficiently received by the impeller 18 and does not impede rotation of the impeller 18, allowing for a multiplication of the torque passing through the launch device. With this fluid coupling, rotation from the output of the engine is transferred as rotation of the input shaft 28 of the automatic transmission.

Integrated with the stator 30 is a one-way clutch assembly 50 that limits rotation of the stator 32 to a single direction. The one-way clutch assembly 50 includes an outer race 52, upon which the stator 30 is supported, and an inner race 54. The inner race 54 of the one-way clutch assembly 50 is mounted upon a fixed, nonrotating support shaft 56 associated with the input of the automatic transmission. In the interest of brevity and since one-way clutch assemblies are well known in the technological field of the present invention, those skilled in the art will really appreciate the construction and operation of the one-way clutch assembly 50 and, as such, the assembly 50 is not explained in greater detail herein.

Forward of the turbine 22, between the turbine 22 and the front cover 12, the launch device 10 includes a main damper 32. The main damper 32 is mounted to an output hub 33 that is in turn mounted on the input shaft 28 of the transmission. The splined connection of the turbine hub 26, discussed above, is likewise mounted to the output hub 33. The main damper 32 absorbs variations in the rotation speed of the front and rear covers 12, 18 to provide for smoother operation of the automatic transmission and for the transmission of less vibration to the occupant of the vehicle.

The main damper 32 includes an input member 34 that is connected to a clutch plate 36 of a lock-up clutch 38, an output member 40 fixed to the turbine hub 33, springs 42, 44 arranged between the input member 34 and the output member 40, a first intermediate member 46 and a second intermediate member 48. The input member 34 is fixed to the clutch plate 36 and rotates together therewith.

The spring 42 is arranged in the circumferential direction between the input member 34 and part of the first intermediate member 48. Another spring, not shown, is displaced from the spring 42 in the circumferential direction and located between the first intermediate member 46 and the second intermediate member 48. Furthermore, the spring 44 is arranged in the circumferential between the second intermediate member 48 and the output member 40. Accordingly, rotation inputted to the input member 34 is sequentially transmitted to the output member 40 through the spring 42, the first intermediate member 46, the unillustrated spring, the second intermediate member 48, and the spring 44, in that order.

The lock-up clutch 38 includes the clutch plate 36 mentioned above, a friction material 56 provided on radially outer periphery of the clutch plate 36 and an opposing portion 58 of the front cover 12, which may optionally be provided with a friction material. The clutch plate also a radially inner portion forming a hydraulically actuated piston 60. The piston 60 may be biased away from the front cover 12 by a return spring (not shown). When oil chamber 62 is pressurized, the piston 60 is biased toward the front cover 12 and the lock-up clutch 38 engages as a result of the friction surface 56 contacting the opposing portion 58 of the front cover 12. When the oil chamber 62 is not pressurized, the pressure of oil in chamber 64, which located between the piston 60 and the front cover 12, along with the return spring if provided, causes the lock-up clutch 38 to disengage and open as a result of the friction surface 56 releasing from the opposing portion 58 of the front cover 12. Since further aspects of isolation dampers are well known in the technological field of the present invention, the main damper 32 of the launch device 10 is not discussed in further detail herein, except as necessary.

During operation of the launch device 10, in the clutch open mode, hydraulic fluid is received along one or more passageways (not shown) formed in the input shaft 28, flows through bearing 66 and into the chamber 64 between the piston 60 of the lock-up clutch 38 and the front cover 12. During this clutch open mode, pressure in chamber 64 is greater than chambers elsewhere in the launch device 10, keeping the lock-up clutch 38 open.

From chamber 64, fluid flows radially around the piston 60 into a circumferential chamber 68, which is generally defined between the radial sides of the front and rear covers 12, 16 and the turbine 22. Some of this fluid then also passes from the circumferential chamber 68 into the hydrodynamic space between the impeller 18 and the turbine 22, where the fluid operates to define the fluid coupling within the launch device 10. Hydraulic fluid can also pass from the fluid coupling into pathway 70 and exit the launch device 10 through a passage 72. Flow in the reverse direction initially operates to close the lock-up clutch 38. With pressure in the circumferential chamber 68 and between the turbine 22 and piston 60 being greater than pressure in chamber 64, the piston 60 axially moves along the outer surface of the output hub 33. Once in clutch closed mode, the only flow is leakage or seepage through the lining material of the lockup clutch assembly or various oil seals.

It should be noted that the described fluid flow is for the illustrated launch device 10. The exact fluid flow can and will vary based on the specific design criteria of the launch device.

The launch device 10 seen in FIG. 2 additionally includes an active dynamic damper (ADD) system 80. The ADD system 80 includes an ADD clutch 82 and an ADD piston 84.

The ADD clutch 82 is arranged between the main damper 32 and the turbine 22 and is connected to the input shaft 28 of the transmission by an inner side plate 86 of the main damper 32 and by the output hub 33. The ADD clutch 82 further includes a reaction plate 88 provided on the turbine 22 with a reaction surface 90 that opposes a reaction surface 92 supported on an extension 94 of the side plate 86. Optionally, the reaction surface 90 or reaction surface 92 may be provided with a friction enhancing material.

The turbine 22 is mounted to an end of the ADD piston 84, by rivets or other means, and the ADD piston 84 is connected to the output hub 33 via a splined engagement. This splined engagement allows the ADD piston 84 to move axially along the output hub 33 and transfer torque into the output hub 33. Optionally, the turbine and ADD piston may be unitarily formed as a one-piece component.

An axial reaction plate 96 is stationarily provided on an end of the output hub 33, axially beyond the ADD piston 84, and extends radially from the end of the output hub 33. The mounting of the axial reaction plate 96 may be on the same splined portion of the output hub 33 as the ADD piston 84 or may be mounted on a splined reduced diameter portion of the output hub 33, as shown in FIG. 2. The axial reaction plate 96 is spaced apart from the ADD piston 84 and an upper end of the axial reaction plate 96 sealingly engages a corresponding portion of the ADD piston 84 to permit axial movement relative thereto. As a result, the ADD piston 84, the axial reaction plate 96 and the output hub 33 cooperate to define an ADD pressure chamber 98. The ADD pressure chamber 98 is in communication with hydraulic fluid from the transmission via a fluid passage 100 defined through the outlet hub 33 and a corresponding fluid passageway (not shown) in the input shaft 28. As an alternative to the hydraulic fluid, the ADD pressure chamber 98 may be operated with a different fluid, such as pressurized air, from a source other than the transmission. Upon an increase in the fluid pressure provided to the ADD pressure chamber 98 and with the ADD reaction plate 96 being stationary, the ADD piston 84 is caused to move forward, toward the engine of the vehicle. This movement of the ADD piston 84 causes forward movement of the turbine 22 and the ADD reaction plate 88 carried thereon. Upon sufficient movement, the reaction surface 90 of the reaction plate 88 contacts the opposing reaction surface 92 of the ADD clutch 82 and closes the ADD clutch 82.

During operation of the launch device 10, the ADD system 80 is inactive and open until the lock-up clutch 38 is closed. When the lock-up clutch 38 is closed, torque enters the main damper 32 and the ADD system 80 is operational. The ADD system 80 is designed to operate in a specific frequency (rotational speed) of the main damper 32. When the main damper 32 is operating in a frequency range that is outside the influence of resonance, fluid pressure in the ADD chamber 98 is decreased and the ADD clutch 82 is open/disengaged so that the main damper 32 may operate freely. However, when the main damper 32 is operating in a frequency range where resonance may be an influence on the system, pressure in the ADD pressure chamber 98 is increased. Depending on the frequency, the increase in pressure either causes the ADD clutch 82 to lockup or slip, thereby changing the natural frequency and eliminating the influence of resonance on the main damper 32 and launch device 10.

Figure 3A:
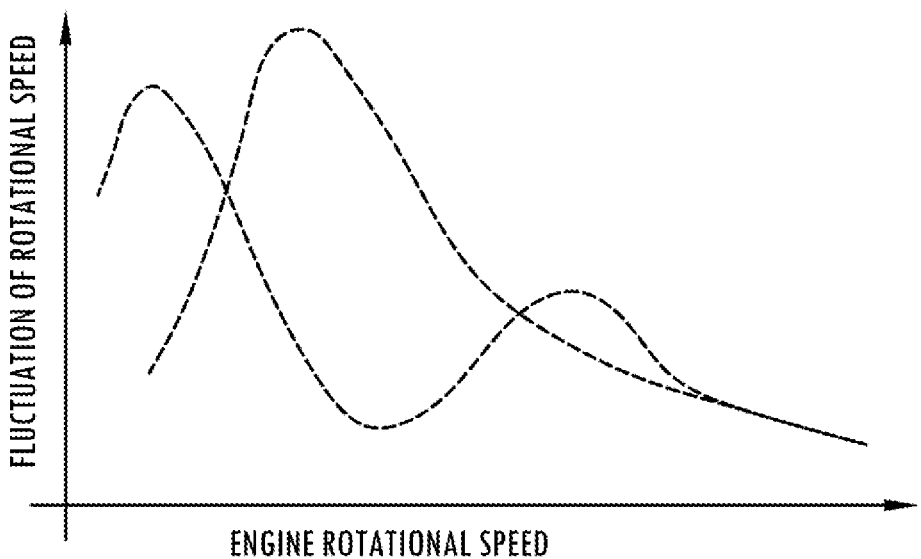
FIG. 3a is a graph of fluctuations in rotational speed of a representative conventional torque converter relative to engine rotational speed showing a single resonance peak when not using a dynamic damper and showing two resonance sideband peaks when using a dynamic damper.
Figure 3B:
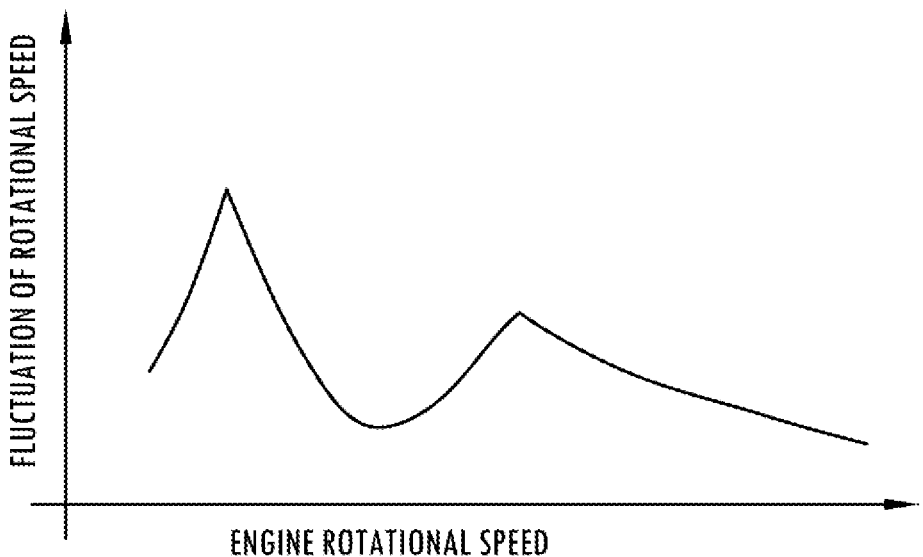
FIG. 3b is a graph of fluctuations in rotational speed of a torque converter, embodying the principles of the present invention, relative to engine rotational speed and showing a reduction in the resonance sideband peaks.

Conventional dynamic dampers have the possibility to worsen NV in specific frequency ranges because of the resonance specific to the dynamic damper. As seen in FIG. 3A, fluctuations in rotational speed of a representative conventional torque converter relative to engine rotational speed is seen with a single resonance peak when not using a dynamic damper (represented by the dash-dash line) and seen with two resonance sideband peaks when using a dynamic damper (represented by the dash-dot-dash line). These various peaks are increased at lower and higher engine speeds as a result of resonance. With incorporation and application of the present active dynamic damper system 80, as seen in FIG. 3B, the side band peaks can be reduced, shown in the solid line, allowing the main damper 32 to operate more effectively over its natural frequency range, shown in dash-dash lines.

As will be appreciated by those skilled in the art, the ADD system 80 provided herein could be incorporated with main dampers of a construction differing from the main damper 32 described herein. Also, the construction of the ADD system 80 itself could vary from that described herein. For example, the ADD system 80 could be composed of another dynamic spring mass absorber aimed at targeting engine order.

As a person skilled in the art will readily appreciate, the above description is meant as an illustration of at least one implementation of a launch device incorporating the principles of the present invention. This description is not intended to limit the scope or application of this invention since the invention is susceptible to modification, variation and change without departing from the spirit of this invention, as defined in the following claims.

We claim:

1. A launch device for coupling a rotary output of a prime mover to a rotary input of a transmission, the launch device comprising:
    a front cover configured to connect to the rotary output member of the prime mover;
    an output hub configured to connect to the rotary input of the transmission;
    a rear cover connected to the front cover and rotatable therewith, the front cover and the rear cover cooperating to define a chamber;
    an impeller having a plurality of impeller blades extending in the chamber;
    a turbine located within the chamber and including a plurality of turbine blades generally opposing the impeller blades such that hydraulic fluid is directed from the impeller blades and toward the turbine blades;
    a main damper coupled between the front cover and the output hub of the launch device;
    a lock-out clutch coupled to the main damper and configured to releasably lock the main damper for rotation with one of the front and rear covers; and
    an active dynamic damper (ADD) system coupled to the main damper and configured to reduce resonance influence on the main damper, the ADD system including an ADD clutch coupled to an ADD piston, the ADD piston being axially moveable and configured to move the ADD clutch between an open position where the ADD system is inactive and a closed position where the ADD system is operational, a first portion of the ADD clutch being supported by the main damper and a second portion of the ADD clutch is supported by the turbine, wherein the second portion of the ADD clutch includes a reaction plate extending from the turbine, the reaction plate having a reaction surface opposing, for direct contact, a corresponding reaction surface of the first portion of the ADD clutch.

2. A launch device for coupling a rotary output of a prime mover to a rotary input of a transmission, the launch device comprising:
    a front cover configured to connect to the rotary output member of the prime mover;
    an output hub configured to connect to the rotary input of the transmission;
    a rear cover connected to the front cover and rotatable therewith, the front cover and the rear cover cooperating to define a chamber;
    an impeller having a plurality of impeller blades extending in the chamber;
    a turbine located within the chamber and including a plurality of turbine blades generally opposing the impeller blades such that hydraulic fluid is directed from the impeller blades and toward the turbine blades;
    a main damper coupled between the front cover and the output hub of the launch device;
    a lock-out clutch coupled to the main damper and configured to releasably lock the main damper for rotation with one of the front and rear covers; and
        an active dynamic damper (ADD) system coupled to the main damper and configured to reduce resonance influence on the main damper, the ADD system including an ADD clutch coupled to an ADD piston, the ADD piston being mounted to and axially moveable along the output hub and being configured to move the ADD clutch between an open position where the ADD system is inactive and a closed position where the ADD system is operational, a first portion of the ADD clutch being supported by the main damper and a second portion of the ADD clutch is supported by the turbine, an axially stationary reaction plate amounted to the output hub and cooperating with the ADD piston to define an ADD pressure chamber between the axially stationary reaction plate and the ADD piston.

3. The launch device according to claim 2, wherein the first portion of the ADD clutch is mounted to a side plate of the main damper.

4. The launch device according to claim 2, wherein the turbine is coupled to the ADD piston and moveable therewith.

5. The launch device according to claim 4, wherein the turbine is mounted to the ADD piston.

6. The launch device according to claim 2, wherein the ADD piston is mounted to a first portion of the output hub and the stationary reaction plate is mounted to a second portion of the output hub that is different from the first portion of the output hub.

7. A launch device for coupling a rotary output of a prime mover to a rotary input of a transmission, the launch device comprising:
- a front cover configured to connect to the rotary output member of the prime mover;
- an output hub configured to connect to the rotary input of the transmission;
- a rear cover connected to the front cover and rotatable therewith, the front cover and the rear cover cooperating to define a chamber;
- an impeller having a plurality of impeller blades extending in the chamber;
- a turbine located within the chamber and including a plurality of turbine blades generally opposing the impeller blades such that hydraulic fluid is directed from the impeller blades and toward the turbine blades;
- a main damper coupled between the front cover and the output hub of the launch device; a lock-out clutch coupled to the main damper and configured to releasably lock the main damper for rotation with one of the front and rear covers; and
- an active dynamic damper (ADD) system coupled to the main damper and configured to reduce resonance influence on the main damper, the ADD system including an ADD clutch coupled to an ADD piston, the ADD piston being mounted to and axially moveable along the output hub and being configured to move the ADD clutch between an open position where the ADD system is inactive and a closed position where the ADD system is operational, a first portion of the ADD clutch being supported by the main damper and a second portion of the ADD clutch is supported by the turbine, an axially stationary reaction plate spaced from the impeller and cooperating with the ADD piston and defining an ADD pressure chamber between the axially stationary reaction plate and the ADD piston, and a wherein the fluid passageway coupled to the ADD pressure chamber and at least partially defined by the output hub.

* * * * *